US006493731B1

(12) United States Patent
Jones et al.

(10) Patent No.: US 6,493,731 B1
(45) Date of Patent: Dec. 10, 2002

(54) DOCUMENT MANAGEMENT SYSTEM FOR RECORDING AND VIEWING THE HISTORY OF DOCUMENT USE

(75) Inventors: Rachel Jones, Haslingfield (GB); Paul Dourish, San Francisco, CA (US); Allan MacLean, Bottisham (GB); Richard Bentley, Cambridge (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/238,092

(22) Filed: Jan. 27, 1999

(51) Int. Cl.[7] .............................................. G06F 15/00
(52) U.S. Cl. ...................... 707/501.1; 707/500; 707/530
(58) Field of Search ................................. 707/501, 513, 707/522, 501.1, 530, 102, 511, 911, 500; 345/761, 762

(56) References Cited

U.S. PATENT DOCUMENTS

| | | | | |
|---|---|---|---|---|
| 5,142,663 A | * | 8/1992 | Janis et al. | 707/205 |
| 5,581,691 A | * | 12/1996 | Hsu et al. | 714/15 |
| 5,793,966 A | * | 8/1998 | Amstein et al. | 709/203 |
| 5,855,014 A | * | 12/1998 | Smith | 707/10 |
| 5,999,911 A | * | 12/1999 | Berg et al. | 705/7 |
| 6,052,514 A | * | 4/2000 | Gill et al. | 395/331 |
| 6,092,048 A | * | 7/2000 | Nakaoka | 705/9 |
| 6,249,794 B1 | * | 6/2001 | Raman | 707/500 |
| 6,253,239 B1 | * | 6/2001 | Shklar et al. | 709/217 |
| 6,282,548 B1 | * | 8/2001 | Burner et al. | 707/104 |

FOREIGN PATENT DOCUMENTS

WO      98/01807    *   1/1998

OTHER PUBLICATIONS

Dourish, Paul et al. "Freeflow: Mediating Between Representation and Action in Workflow Systems," *Proceedings of the ACM Conference on Computer Supported Cooperative Work CSCW'96*, Boston, MA, Nov. 1996.

Freeman, Eric and David Gelernter. "Lifestreams: A Storage Model for Personal Data," ACM SIGMOD Record, vol. 25, No. 1, Mar. 1996.

"Dublin Core Metadata Element Set: Reference Description," originally published on the Internet at: http://purl.org/DC/about/element_set.htm.

"InConcert Data Sheet," by InConcert, Inc., 1998, originally published on the Internet at: http://www.inconcertsw.com/solution/datasheet.htm.

"Resource Description Framework (RDF) Model and Syntax Specification: W3C Proposed Recommendation," Jan. 1999, originally published on the Internet at http://www.w3.org/TR/1999/PR–rdf–syntax–19990105/.

"White Paper: Object–Oriented Workflow Technology in InConcert," by InConcert, Inc., 1998, published on the Internet at http://www.inconcertsw.com/solution/sunil.htm.

* cited by examiner

*Primary Examiner*—Stephen S. Hong
*Assistant Examiner*—Thu V. Huynh

(57) ABSTRACT

A document management system is adapted to operate with a process management system for recording and viewing metadata of a document. The document metadata is used to record resources referenced while the content of the document is developed. The resources are recorded in the document metadata to identify relationships between the resources and the content of the document. The document content includes links that reference the document metadata stored on a remote server. The resources recorded in the document metadata and the content of the document are simultaneously displayed on a user interface of the document management system to provide context for understanding document history. By storing document metadata and document content separately, the metadata of the document remains consistent even when multiple copies of the document are distributed over a network.

20 Claims, 12 Drawing Sheets

Workflow Manager:

Status: editing content of "Letter" in "Make Offer" Document

Completed Tasks:
- Submit Application
- Risk Assessment 1
- Obtain References
- Risk Assessment 2

Pending Task: Make Offer  [Completed]  [Save Changes]

Editing "Letter":

[letter document preview]

"Letter" Resources:
- Bank Account Information
- Resume
- Credit Report

Resource Name: [        ]
Resource URL: [        ]
[Manually Add Resource]

[Save Changes And Return To Task Document]
[Cancel And Return To Task Document]

[Delete Selected Resource(s)]
[Edit Properties Of Selected Resource]

Workflow Manager Options:  [Update Options]
- ☒ Automatically Record Resource(s) Referenced While Editing Document
- ☒ Be Prompted To Define Reason For Relationships Between Document and Resource(s)

FIG. 8

DOCUMENT MANAGEMENT SYSTEM FOR RECORDING AND VIEWING THE HISTORY OF DOCUMENT USE

CROSS-REFERENCE TO RELATED APPLICATION

Cross-reference is made to U.S. patent application Ser. No. 09/239,042, entitled "Process Management System Wherein Process Descriptions Provide Indices To Document Histories", which Is assigned to the same assignee as the present invention and hereby Incorporated by reference.

BACKGROUND OF THE INVENTION

1. Field of the Invention

The present invention relates generally to a document management system, and more particularly, to a document management system for recording, tracking and viewing documents referenced while developing the content of documents in for example a process management system.

2. Description of Related Art

Process management systems, which include workflow management systems, have become a widely deployed form of technology for supporting collaborative work. An important characteristic of process management systems is their ability to increase productivity by automating the flow of business processes. Productivity is increased by efficiently structuring process descriptions (i.e., routing paths). of documents from person to person or group to group so that information is provided to the right person at the right time. More specifically, the function of process management systems is to provide specific sets of information, such as documents, to a series of persons, groups, or other entities such as computers, in a given sequence so that the various persons, groups, or other entities can, for instance, approve, modify, or otherwise process the information according to a predefined process description or work process.

An example of a workflow management system is InConcert™ (which is sold by InConcert Inc.). InConcert™ allows organizations to model, execute, monitor, and dynamically control business processes that involve multiple human participants and multiple software systems. More specifically, InConcert™ captures information about each process: its owner, task sequence, necessary documents, applications, and the names of users responsible for task execution. Also, InConcert™ automatically prompts and tracks all tasks in the workflow process, actively locating the specific documents and software tools required for each step of a project and delivering them at the right time to those who need them. By automatically tracking all tasks and processes, InConcert™ provides complete and timely status on those activities.

Process descriptions (i.e., process definitions) are used in process management systems to describe the flow of work and organizational responsibility in the performance of organizational processes (i.e., a process management system's representation of the work process). That is, process descriptions are used to coordinate activities of different persons, groups, or other entities that are distributed in time and space so that they operate together more efficiently. Completing each task in the process description may require both knowledge and document intensive activities that are dependent on earlier completed tasks.

An implicit assumption behind the division of a process into a number of different tasks is that the accomplishment of these tasks is independent as long as the correct sequence is maintained. Assuming that the tasks defining a process description can be performed independently of each other leads to a decontextualization of activity. That is, decontextualization of activity causes individuals' to lose their ability to manage the overall progress of work rather than the specifics of each individual task. In addition, decontextualization of activity leads to homogenization of the process execution (i.e., an assumption that the process is performed in just the same way every time). To solve these problems, tasks in the process description require that informed judgments be made about work carried out elsewhere in the process description. In other words, the work product (i.e., task documents) created by someone carrying out a task must be intelligible to those carrying out other tasks in the process description.

One means to make the work product intelligible is to record and reveal information about the activities surrounding the creation of the work product; that is, any ancillary documents used, materials consumed, people consulted, etc., in the course of carrying out the task. These elements contribute to the history of the working process, and so can help to make clear the actual activity involved in carrying out a task. Understanding the context in which a document is developed and used requires access to information about previous documentrelated activities. Accordingly, the history of a working process description provides those operating in a collaborative setting with the ability to view a document in the context that individuals formed about previous activities on the document.

Accordingly, it would be advantageous to provide a workflow system in which process description can be used as an index into the history of the creation of a task document. It would be further advantageous to provide a document management system that permits a user who is working on a particular task to view work product activity of other tasks from the vantage point of another point in the process description. Advantageously, such a workflow system presents completed work product of a particular task in an intelligible form to others either executing or reviewing completed tasks in the process description.

SUMMARY OF THE INVENTION

In accordance with the invention, there is provided a method and apparatus therefor, for using process descriptions within a process management system, such as workflow, to structure and retrieve information about the ways in which documents were created, modified and used in the context of particular activities within the process. The process management system creates, modifies and uses the process descriptions to both manage ongoing tasks as well as historical information concerning pending tasks defining the process description. Advantageously, users of the process management system are provided with means for understanding the context in which the past tasks in the process description were carried out, thereby providing insight into the current task. In effect, each completed task is associated with a perspective that relates task activity to the current task being performed.

In accordance with one aspect of the invention, a document management system provides means for recording and viewing activity of document use in for example the process management system. The document management system includes a user interface for receiving commands from an operator of the document management system. Also forming part of the document management system is a first memory, a second memory, and a processor. The first memory records content of a document developed at said user interface. The second memory records metadata of the document, which specifies resources referenced while the content of document is developed. The processor accesses the metadata of the document to identify relationships between the resources specified in the metadata and the content of the document. The resources identified in the metadata of the document provide context for understanding the document's history. In effect, the metadata of the document, which includes information relating to the creation, modification and use of other documents or objects of interest, provides a history tracking mechanism for the document.

In accordance with another aspect of the invention, the document management system distributes document content so that the metadata associated with that content is not re-instantiated with each copy distributed over, for example, a network. By distributing document content with a global reference to the metadata of the document, the document is given a global existence. Advantageously, by passing metadata of a document using a global reference, the document's metadata can be processed independent of a document's format. Furthermore, passing metadata of a document using a global reference advantageously enables the creator of the document content to retain control over the metadata of the document, thereby minimizing volatility of document metadata.

BRIEF DESCRIPTION OF THE DRAWINGS

These and other aspects of the invention will become apparent from the following description read in conjunction with the accompanying drawings wherein the same reference numerals have been applied to like parts and in which:

FIG. 8 illustrates one embodiment in which the program interface of FIG. 7 is used to edit content of the task document;

DETAILED DESCRIPTION

A. Definitions

For purposes of the following description, certain specific terms will here be defined:

PROCESS DESCRIPTION: A process management system's representation of a work process, which can be a specification that describes the order in which a work process is expected to be executed.

TASK: A self-contained unit of work in a process description.

TASK DOCUMENT: A document created in order to complete an instance of a task of a process description. The task document may comprise one or more documents.

PROCESS DOCUMENT: A document that contains task documents associated with an instance of a process description.

DOCUMENT: A document is any object that contains or identifies (e.g., URL) information.

PROCESS DEPENDENCIES: A sequential relationship that specifies the relationships between the tasks of the process description.

RESOURCE OBJECT: A data structure that records resources of a task document.

RESOURCE: A resource is any information that gives insight in the way a document has been created, modified or used. One or more resources define the history of a document.

METADATA: Any data in or referenced by a document that refers to information about a document that is not part of the content of the document (e.g., filename, creation date, file size, author).

B. Process Management System with Task Documents

Figure 1:
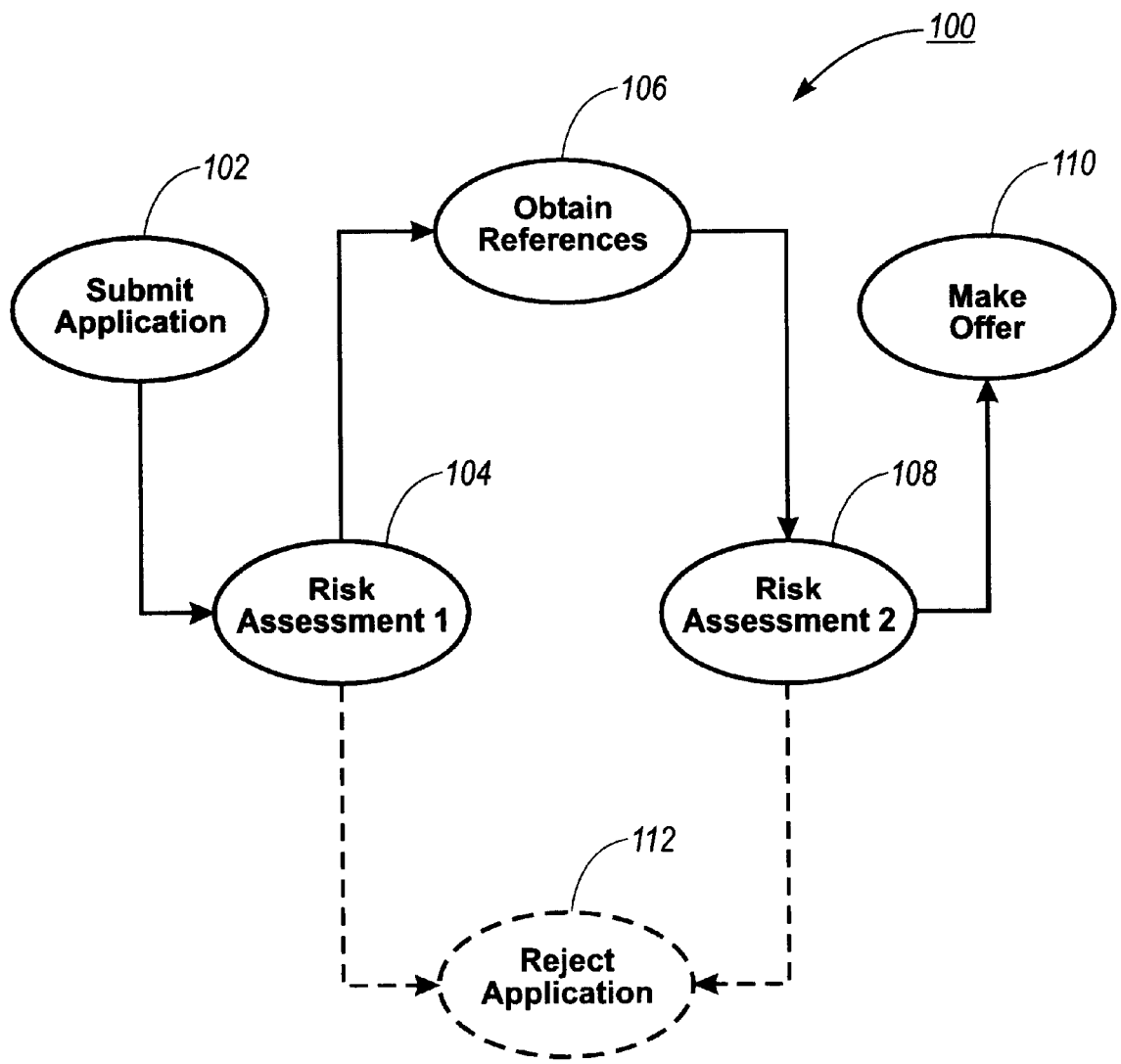
FIG. 1 illustrates a diagram showing the interrelationship of tasks in a typical workflow process definition.

FIG. 1 is a graphical flow diagram that illustrates an example of a process description 100 of a mortgage application process. It will be appreciated by those skilled in the art that the mortgage application process description set forth in FIG. 1 is presented to illustrate the various aspects of the present invention. Thus, more generally, the process description illustrated in FIG. 1 is representative of a workflow system for supporting the execution of a work process operating in a collaborative working environment in which work can be divided into individual parts. In such workflow systems, the process description records the dependencies and relationships between the tasks defining a specific work process.

In operation, one or more instances of the work process illustrated in FIG. 1 can be managed by a computer system that operates in centralized or a distributed computing environment. Each instance of the work process illustrated in FIG. 1 represents a single mortgage application. As is apparent from FIG. 1, documents created or information analyzed at earlier stages in the process description may be necessary to complete tasks at later stages in the process description. Thus, the reliability of the results of a task at a later stage may be dependent on the output of a task at an earlier stage. In accordance with the invention, the documents used to derive the output of the task (i.e., task documents) at the earlier stage are provided to those performing tasks at a later stage in the process description.

The arrows connecting each of the tasks in the graphical flow diagram in FIG. 1 represent transitions between the tasks. The transitions are defined by process dependencies in the workflow process definition of a mortgage application process. The product of the mortgage process description illustrated in FIG. 1 is a file of information used to offer or reject a mortgage for a given mortgage application. Each file of information is developed by, gathering, checking and summarizing information in the order specified by the process description. As defined in FIG. 1, the mortgage application process description consists of five tasks: submit mortgage application task 102; perform a first risk assessment of the mortgage candidate task 104; obtain references of the mortgage applicant task 106; perform a second risk assessment task 108; and evaluate whether to make. an offer using the task documents developed task 110. For simplicity, other tasks and transitions such as reject application task 112 are not discussed in the context of the present invention.

Figure 2:
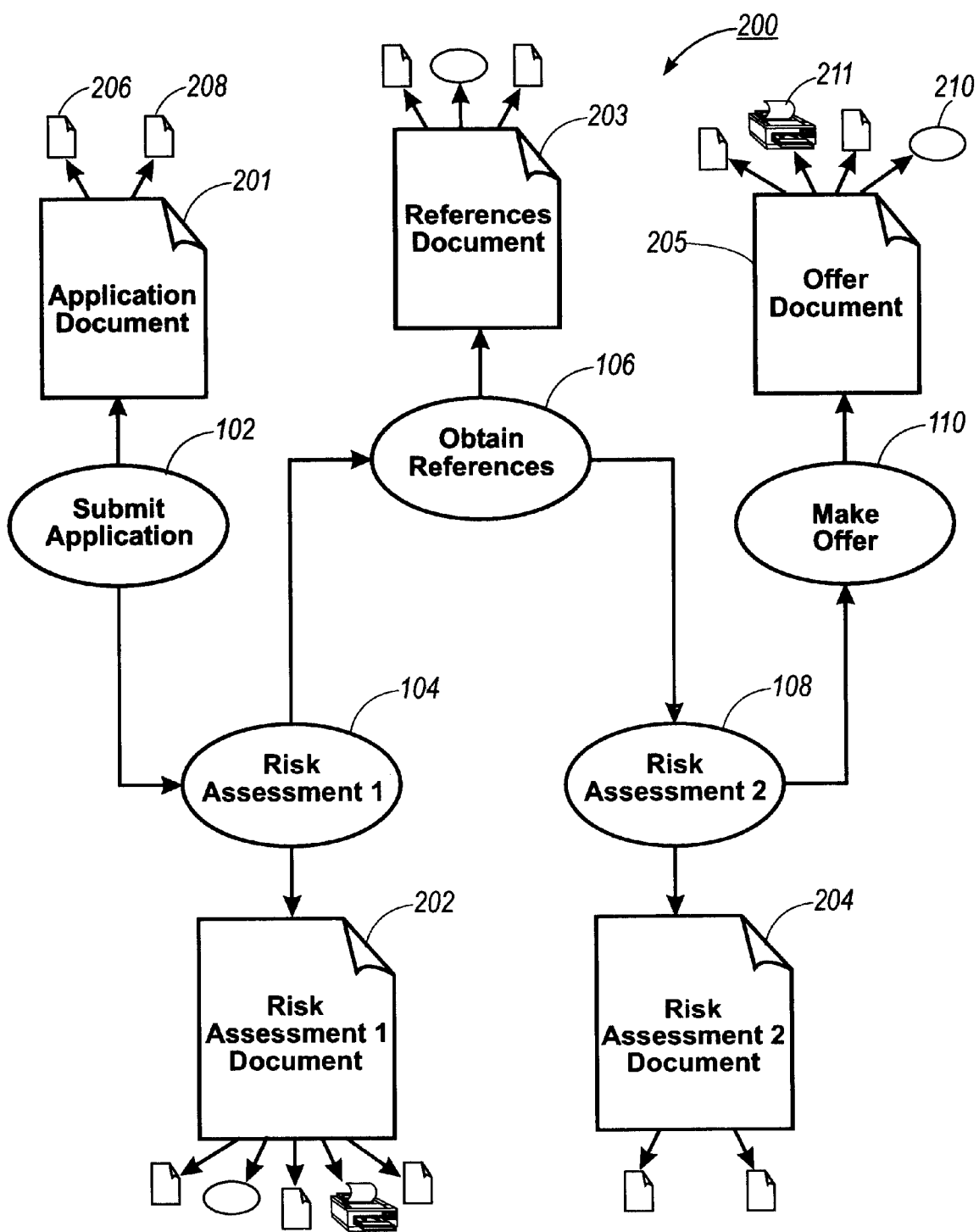
FIG. 2 illustrates a diagram showing the interrelationship of workflow tasks and their completed documents and the resources used to develop the completed documents.

FIG. 2 illustrates one instance 200 of the process description 100 illustrated in FIG. 1. This one instance 200 provides a task level perspective to someone reviewing completed tasks of this particular instance. As each task is completed, task documents are formulated as illustrated in FIG. 2 by the large document icons 201, 202, 203, 204, and 205. For example, upon completing the "submit application" task 102, an application document 201 is created by the person or entity assigned to perform the task in the process description. In accordance with one aspect of the invention, references to resources used to formulate (or complete) the application document 201 are recorded in metadata of the application document. Anything that contributes to the context of task history is an example of resources for a task. More generally, a resource is any item that assisted someone in preparing a task document.

Resources of task documents include, but are not limited to, resource documents (such as resource document 206), resource objects (such as object 210), and resource printers (such as printer 211). Examples of resource documents are procedural manuals, related documents and examples of previous cases. A resource object such as object 210 may, for example, be an email distribution list. Generally, a resource object is any object that relates information to a task document, such as a person's contact information (e.g., phone number, video link, email, etc.) and the reason for the contact. In addition, a resource object can include program information that provides information about other instances of a process description in progress. A resource printer may, for example, identify a printer that is pre-loaded with special forms.

In general, resource documents, printers, and objects capture task history by recording pre-specified resources for a particular task (e.g., a procedure manual, a form, etc.), resources that relate to the task when it was performed (e.g., a person's contact information, articles, email, etc.), and related items (e.g., textual notes, annotations, or other items arising in the course of task execution that may be of value in understanding how the task was performed). For example, in the instance of the process description in FIG. 2, the application document 201 references resource documents 206 and 208. Advantageously, an individual performing the "risk assessment task 2," which is indicated by reference number 108, is able to review the application document 201 in the context of the resource documents 206 and 208 from which it was formulated.

Figure 3:
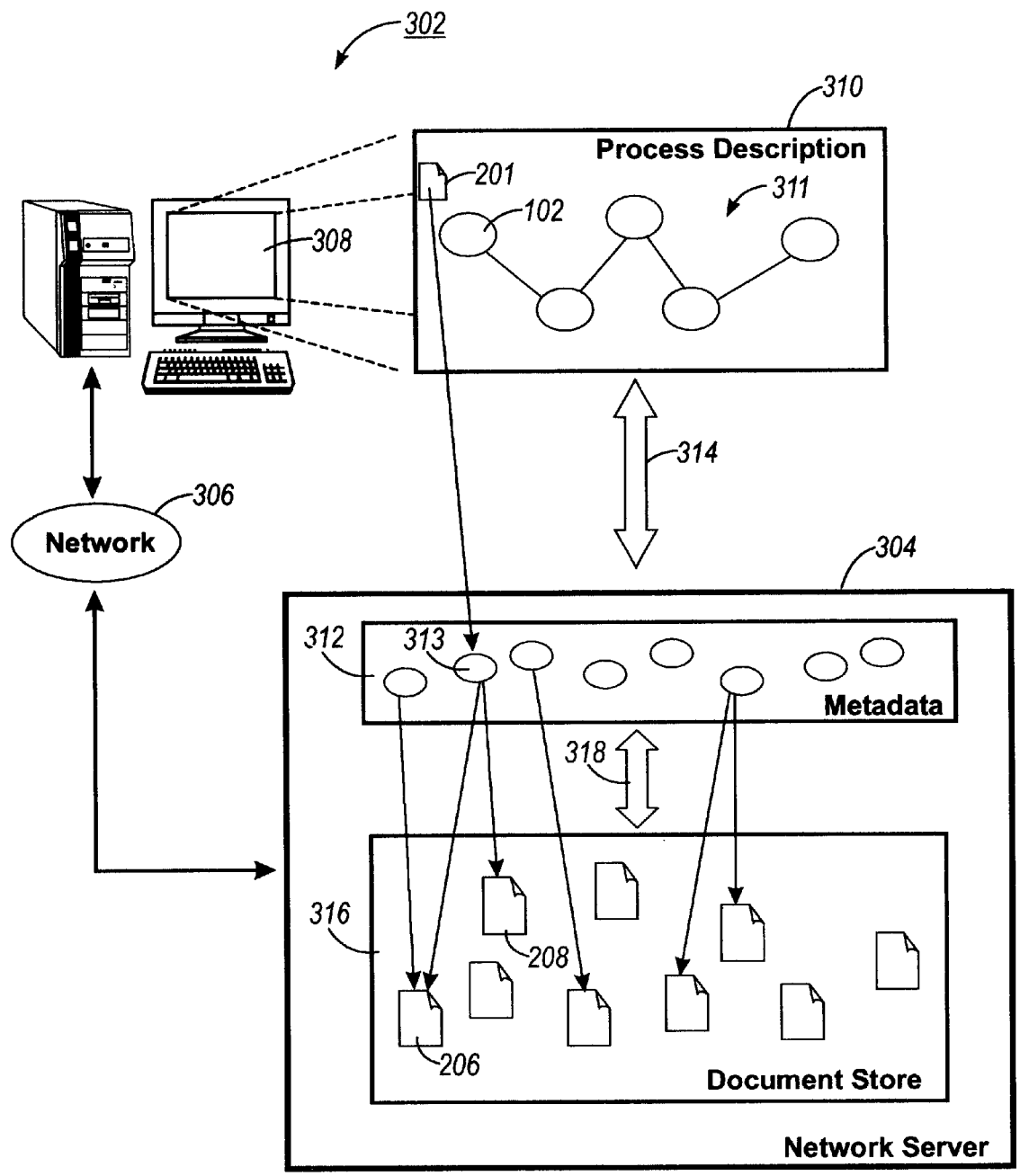
FIG. 3 illustrates an operating environment of a process management system that enables access from the process definition to metadata of a task document that records a history of the content of the task document.

FIG. 3 illustrates an operating environment of a process management system that operates in accordance with the present invention. The operating environment includes one or more network workstations 302 and network file servers 304. The network workstation 302 and the network file server 304 communicate over network 306 using well known communication protocols. In an alternate embodiment, the network server 304 and network workstation 302 are replace by a centralized computer system (not shown). A user interface 310 on display 308 of the network workstation 302 is used to present to an operator of the process management system a specific instance of the workflow process definition, such as the instance 200 of the workflow process definition illustrated in FIG. 2.

More specifically, FIG. 3 illustrates the manner in which a user operating the process management system displayed on the user interface 310 is able to index into the process description to access resources of the task document 204. Unlike the process description 200 illustrated in FIG. 2, the process description 311 illustrated in FIG. 3 has only task 102 completed. Generally, FIG. 3 illustrates the relationship between the process description 310 and metadata 312 (as indicated by arrow 314) and the relationship between the metadata 312 and resources stored in document store 316 (as indicated by arrow 318). More specifically, FIG. 3 illustrates the relationship between the task document 201 and task document metadata 313. In addition, FIG. 3 illustrates the manner in which metadata 313 identifies the resources documents 206 and 208 associated task document 201 recorded in document store 316. The documents in document store 316 include documents that are resources, which were used to formulate that task document 201.

Figure 4:
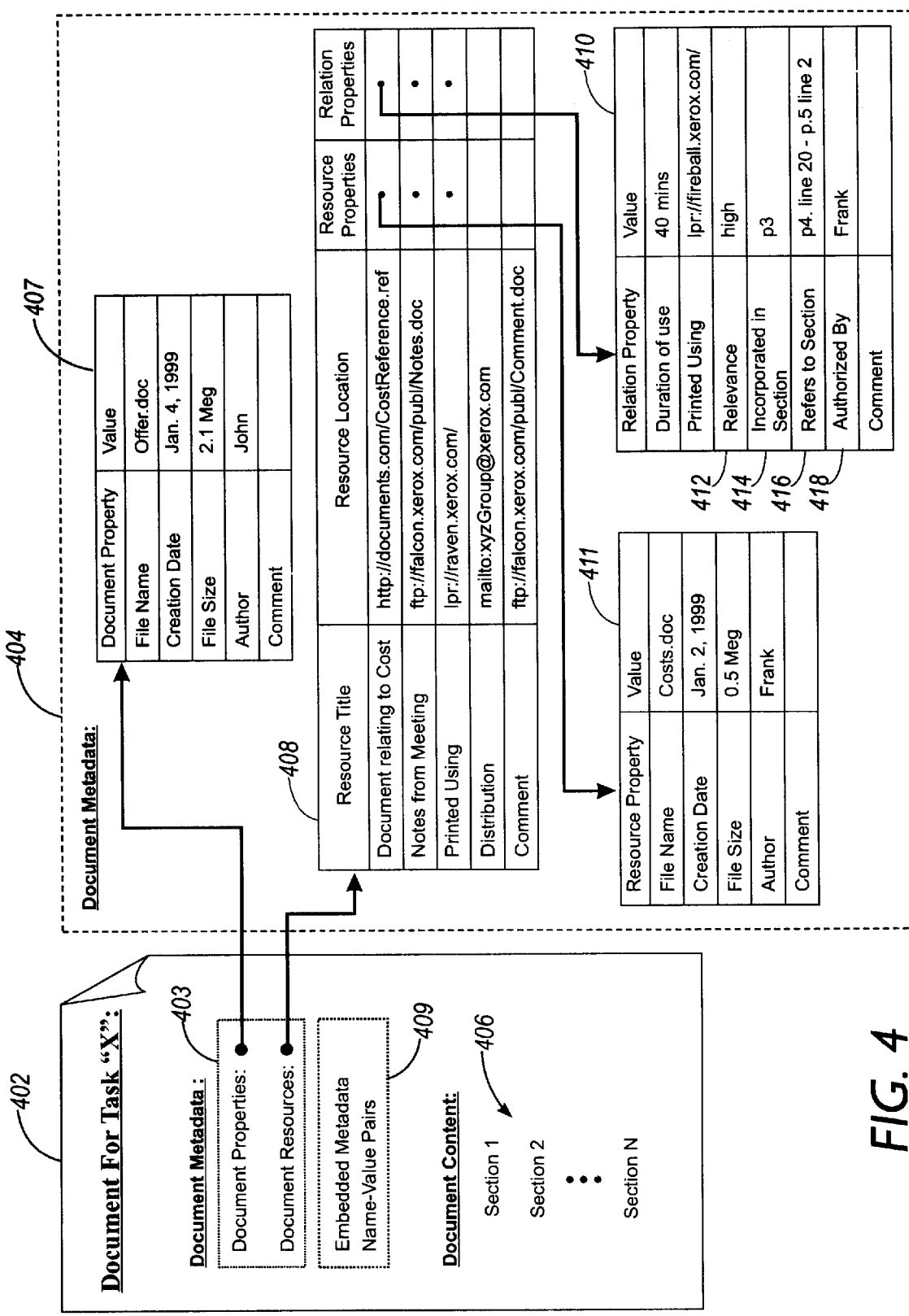
FIG. 4 illustrates an example of a task document having links to metadata that specifies the properties of the task document and the resources used to develop the task document.

FIG. 4 illustrates an example of a task document 402 for a particular task "x". In one embodiment, the task document 402 includes metadata 404, which is referenced by links 403, and content 406. In an alternate embodiment, the task document 402 includes metadata 404 as well as embedded metadata 409. In this alternate embodiment, metadata is stored either with the document content 406 or separate from the document content 406 using links 403. The document content 406 comprises one or more sections. Each section of the document content 406 can be made up of any combination of text, graphics, audio, or video, or a uniform resource locator (URL) identifying any one of the combinations. It is well known that a URL has three elements: a protocol element (e.g., http), an element which recites the name or address of a server on which the section (or document) is located (e.g., www.xerox.com), and an element which defines the local name of the section (or document) (e.g., products.html). Further details relating to the definition of a URL is disclosed by Tanenbaum in "Computer Networks," ISBN 0-13-349945-6.

By recording document metadata 404 in a storage location separate from the content 406 of the task document 402, metadata for that task document 402 is advantageously preserved when copies of the task document 402 are distributed electronically. More details of this advantage of the invention are described in section D below. As illustrated in FIG. 4, the metadata 404 of the task document 402 is made up of document properties 407 and document resources 408, each of which are identified in the task document 402 using URLs or the like. The document properties 407 as illustrated in FIG. 4 are recorded in a table of name-value pairs. The document resources 408 of a task document 402 enables an operator of the system illustrated in FIG. 3 to specify those documents that were used to formulate the content 406 of the task document 402, as described above.

More specifically, the document resources 408 for the task document 402 have name-location pairs as well as links to resource properties 411 and relation properties 410. The resource properties 411 are similar to document properties 407 in that they are a table of name-value pairs. In addition to the document properties 407 and resource properties 411 set forth in FIG. 4, the following additional properties can also be specified in each of the tables of properties: title, subject, keywords, description, publisher, format, unique identifier (e.g., ISBN number), and language. The document resources can also be defined using any number of different protocols such as http, ftp, lpr, and mailto. It will be appreciated by those skilled in the art that other properties and protocols not disclosed herein could be used to carry out the present invention.

In one embodiment, the document resources are recorded using a resource object 410, which is defined using a table of resource name-value pairs. The resource object 410 provides the operator with a mechanism for specifying other documents used to develop the content of the task document 402, but also the particular relationship between the task document and the reference document or object. The types of relationships that can be defined include incorporated in, referred to, or authorized by, as indicated by reference numbers 414, 416, and 418, respectively. These relationships indicate how resources are used to carry out a task. For example, when an aspect of a resource is incorporated in a task document, the operator can specify the particular section of the task document which the reference is incorporated in, as indicated by reference number 416. Each element in the resource object 410 can either be defined manually by an operator or automatically by the process management system.

Documents are not linked to other documents or objects unless a link is established either implicitly or explicitly. Linking two documents together implies that a relationship between the two documents exits. An important piece of information besides the fact that a relationship exits is the relevance of that relationship. Relevance is recorded by a relevance indicator 412. The relevance indicator is high when the resource document is specifically relevant to the particular task being executed. The relevance indicator is low when a resource document is generally relevant to a particular task being executed. The relevance indicator 412 aids someone to filter out particularly important resource documents of a task document. In other words, the relevance indicator provides means for highlighting distinctions among resources that are specific to a particular task and those which are relevant more generally.

Figure 5:
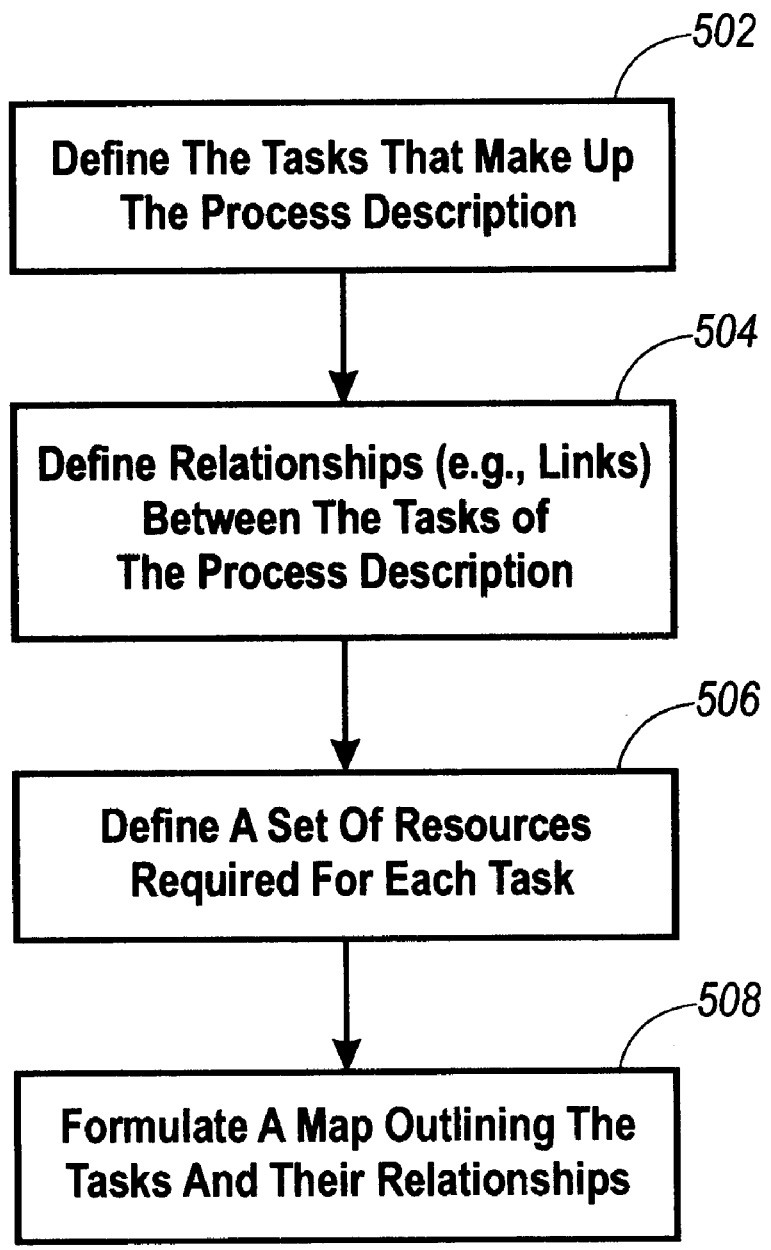
FIG. 5 is a flow diagram illustrating the steps for defining a process description in a process management system.
Figure 6:
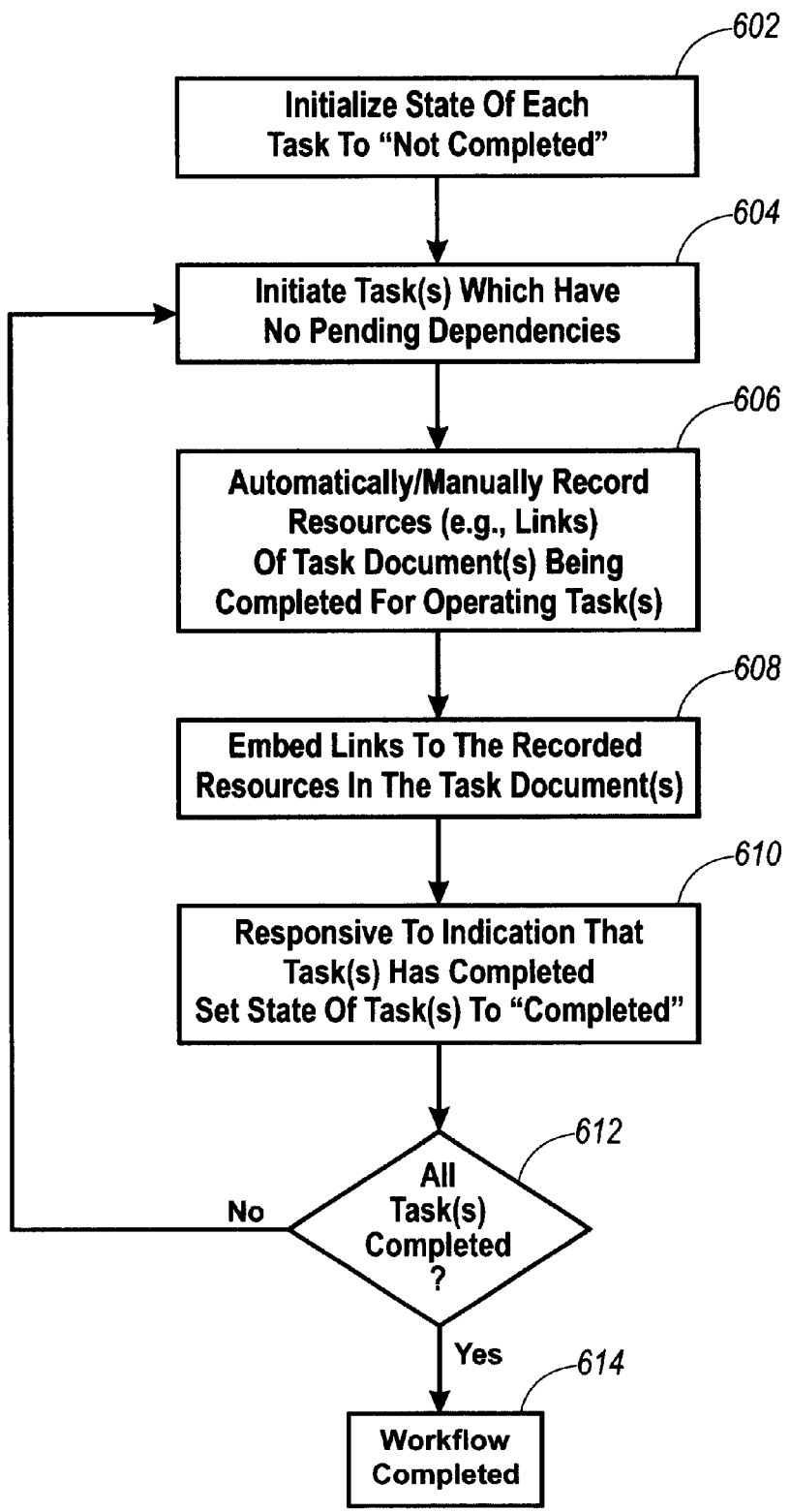
FIG. 6 is a flow diagram illustrating the steps for carrying out an instance of a process description defined using the steps set forth in FIG. 5.

FIGS. 5 and 6 are flow diagrams for operating the process management system in accordance with the present invention. More specifically, FIG. 5 illustrates the steps performed in order to define a process description. Defining a process description entails defining the tasks that make up the process description at step 502. The process description is the heart of a process management system. The process description defines the sequences of actions (or tasks) corresponding to the correct execution of the process description. Tasks can be defined by examining the interaction of individuals that perform different aspects of a workflow process. Once identified, the relationships between the tasks are defined at step 504. In accordance with the invention, ask document resources that may be required to perform a task may then be specified at step 506. These task document resources can provide a hint or a checklist for developing the resources associated with a task document. Finally, at step 508 a map or diagram outlining the tasks defined at step 502 and their relationships defined at step 504 is formulated at step 508 (as illustrated in FIG. 1).

FIG. 6 illustrates the steps performed for carrying out an instance of the process description defined using the steps set forth in FIG. 5. That is, FIG. 6 involves the steps performed for driving the sequences of user actions required to complete all of the tasks defining the process description. Initially at step 600, each task is in one of four states: pending with dependencies; pending with no dependencies; in progress; or completed. Tasks that are pending with dependencies require one or more other tasks to be completed before it can be addressed. It will be appreciated by those skilled in the art that tasks may have other states depending on the particular process description defined. Those tasks with no pending dependencies are initiated at step 602. A task is initiated by alerting a predefined operator or entity identified to perform the task that the task is pending with no dependencies.

In accordance with another aspect of the invention, the process management system then either manually or automatically records resources while a task document (e.g., task document 402) is created for the current task being performed, at step 604. At step 606, links to the resources recorded at step 604 are embedded in the task document as metadata. Once an indication that a task is completed at step 608, the state of the task is set to "completed." When a task is in the completed state, operators performing other task are then granted permission to view the task document, which includes metadata with references to resources used to produce the task document. At step 610, if all task of the process description are in a completed state, the workflow is completed at step 612; otherwise, step 602 is repeated.

More specifically, step 606 and step 608 involve capturing context information, in which a task is performed, and organizing the context information into a manageable form, respectively. Links are one form in which resources are recorded at step 606. Links define relationships between documents by providing context for information defining each completed task in the process description, as well as, the activity performed around each completed task by providing users with information about other documents used in order to complete the task. The other documents comprise sources of information such as manuals used or notes taken while performing the task. For example, the completed submit application document 201 (shown in FIG. 2) may reference a letter of employment (e.g., resource document 206). Resources are organized at step 608 according to the process description. That is, any link between a task document (e.g., task document 201) and its resource document (e.g., resource document 206) is relative to the particular task that is being executed when the relationship was defined (e.g., submit application task 102).

Furthermore, when a document relationship is recorded at step 606 using a link, the link can be defined either explicitly or implicitly (i.e., manually or automatically). Links can be created manually between documents (or objects) when a user drags and drops documents between active regions on a user interface of a display screen. In contrast, links can be created automatically by engaging a process to collect information about desktop activities. In addition to creating a link between documents (or objects), the link can be typed. Links that are typed have recorded information that defines the relationship the link represents. In other words, link typing identifies how a document or an object was used. An untyped link represents that a relationship between two documents exits. In contrast, a link, which has been typed, specifies a more exact relationship between the two documents. For example, a typed linked may indicate that one document is derived from the other, or that one document is a source of information from the other (e.g., relationship indicators 414, 416, and 418).

Advantageously, by using the process description of the process management system as an index into the history of a task document, information of process management systems is organized for convenient retrieval when needed to execute tasks that have yet been completed. To most effectively define the index, the links between the task documents and the document resources should be created at the time the task is executed.

C. Document Management System for Recording and Viewing Metadata

Figure 7:
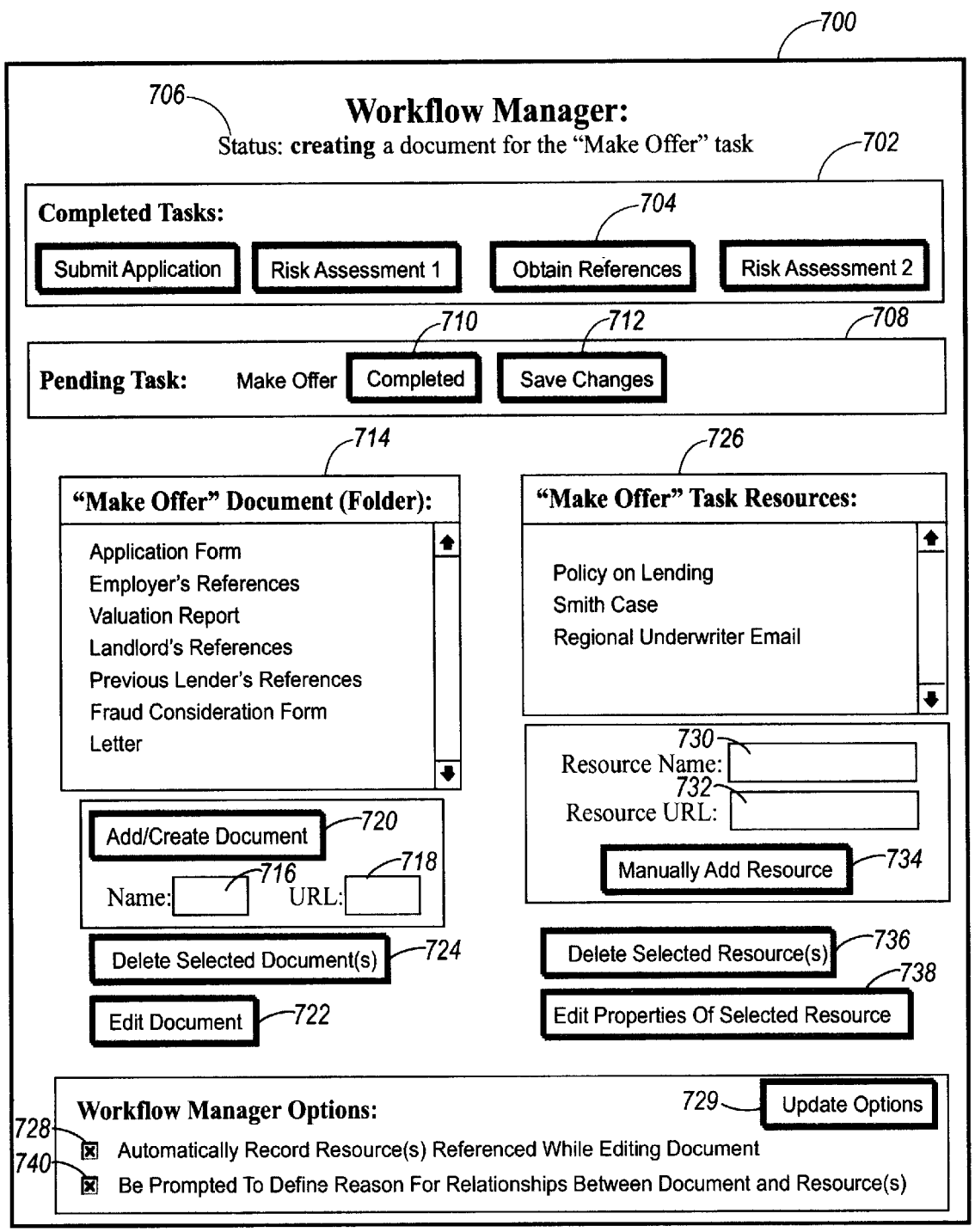
FIG. 7 illustrates a program interface for creating a task document for one task of a workflow process definition.
Figure 9:
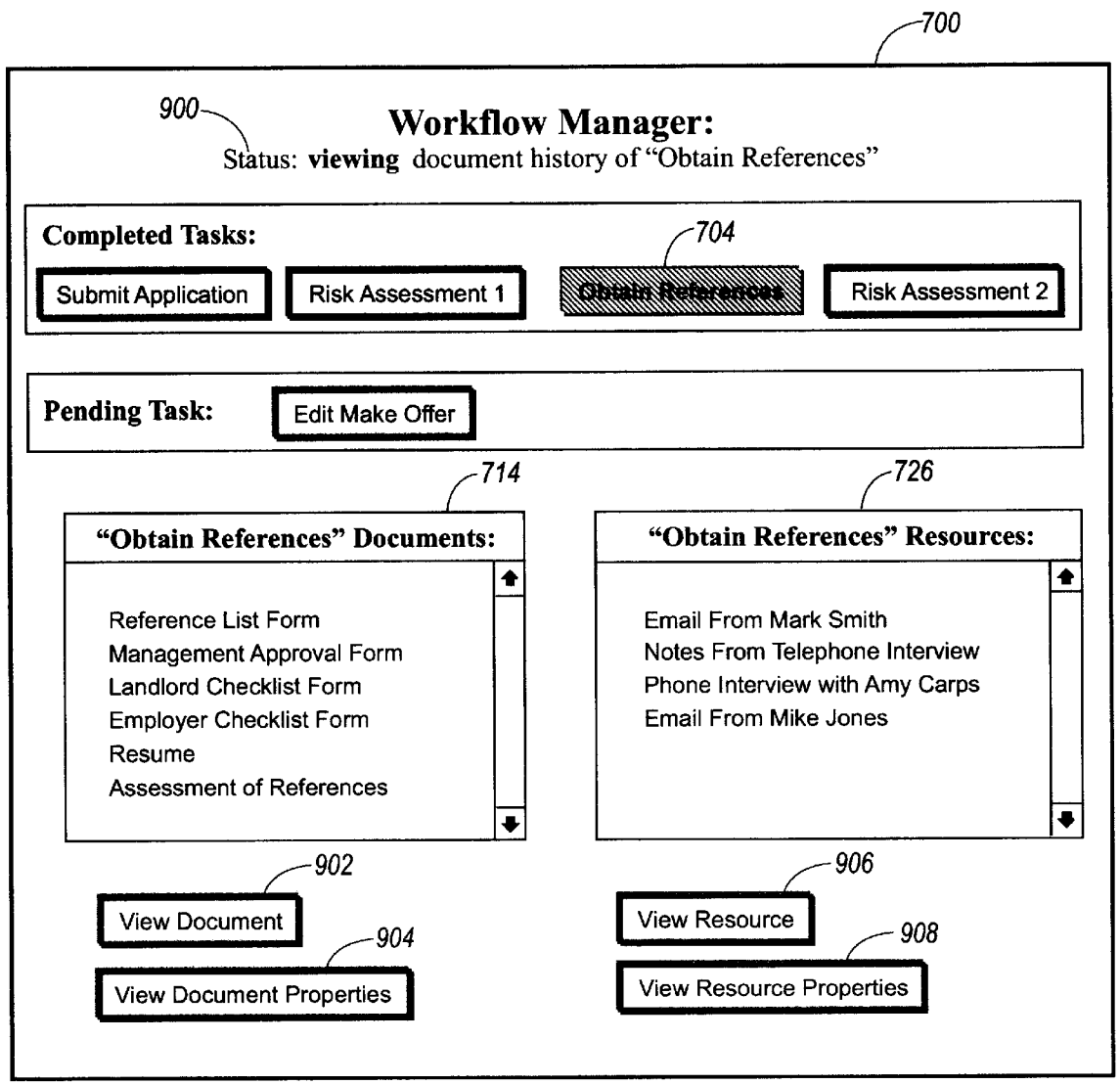
FIG. 9 illustrates one embodiment in which the program interface of FIG. 7 is used to view document histories of completed tasks.

FIG. 7 illustrates a program interface 700 of a document management system for creating a task document for one operating instance of the process description set forth in FIG. 1. In one embodiment, the program interface 700 operates on display 308 of the network workstation 302 illustrated in FIG. 3. The instance of the process description illustrated in FIG. 7 has completed tasks section 702. In accordance with the invention, each of the completed tasks in section 702 (i.e., submit application, risk assessment 1, obtain references, and risk assessment 2) are active buttons that function as indices into the resources of the task documents for each of the completed tasks. FIG. 9, which is described in detail below, illustrates the appearance of the program interface 700 when "obtain reference" active button 704 is selected.

Referring again to FIG. 7, a status indicator 706 identifies the current status of the process management system in the program interface 700. In FIG. 7, the operating instance of the process description set forth in FIG. 1 is in a state in which a task document is being created for the pending "Make Offer" task. Pending tasks are identified in the pending task section 708. At anytime during the operation of the program interface 700, the "Make Offer" pending task can be transitioned from a pending state to a completed state when the operator selects the completed button 710. Alternatively, ongoing work of a task document can be saved while retaining the task document in the pending state by selecting the save changes button 712.

The contents of the "Make Offer" task document are represented by the list of documents (or objects) in document window (or folder) 714. Each document in the document window 714 is stored in the document content 406 of the task document 402 (see FIG. 4) for the "Make Offer" task, such that the document folder 714 contains a complete pool of relevant documents for the particular task in the process description being acted on. The documents populating the document folder 714 for a task are ordered by relevance using the relevance indicator 412. Advantageously, the document folder 714 provides the ability to place documents in the folder simply from the perspective of one task in the process description. That is, the view into the document folder 714 for a given task includes the documents (or objects) that are relevant for processing that task. For example, the view for "Make Offer" is expected to contain different documents compared with the view for "Submit Application." Documents are added (or created) to the document window by specifying a name field 716 and a URL field 718, and by selecting the add/create document button 720. The document added may be a new document or a pre-existing document. The name specified in the text field 716 includes a filename that can take the form of a URL. Documents are deleted from the document folder 714 by selecting the delete document button 724.

While the contents of the "Make Offer" task document are prepared, resources that specify the history of the "Make Offer" task document are recorded either manually (i.e., explicitly) or automatically (i.e., implicitly) in the resource window (or folder) 726. These resources are used to keep track of external artifacts that are used to complete a task. The task documents are likely to be very specific to the particular task. In the absence of resources in the resource folder 726, there may be little or no information in the document folder 714 that indicate the sources used to complete the task. Advantageously, the resource folder 726 aids someone who returns to the review content in the document folder 714 by providing help to that person in understanding the history of the evolution of the documents in the documents folder 714. In addition, the resource window provides the person with access to resources or information about resources that were used to produce (e.g., print, scan, enhance) the documents in the document folder 714. Information about resources includes information that identifies the particular resource used and any comments about the manner in which the resource was used.

As illustrated in FIG. 4, references to metadata are recorded independent from the task document 402. The resource title of the document resources metadata 408 correspond to the titles displayed in the resources folder 726. Resources are automatically recorded by the workflow manager when the workflow manager option indicated by reference number 728 is selected. Options that are changed are updated using update button 729. A process, operating in the process management system on the network workstation 302 for example, that is directed at observing behavior of the user operating the workflow manager automatically records resources. In one embodiment, the process records as resources documents that are open on the display screen 308 while documents forming the contents of the document folder 714 are being edited.

Resources of a task document are recorded manually by filling in the name field 730 and the URL field 732 and selecting add button 734. Properties of resources, which are set forth in detail in FIG. 4, can be edited by selecting edit button 738. Resources that are added either manually or automatically to the resource folder 726 can be deleted by the user of the workflow manager using button 736. Also, a user can specify the option of being prompted to define relationships between a particular resource and a document in the task folder (i.e., link typing), as indicated by reference number 740. When this option is selected a process operating in the process management system intermittently prompts the user of the workflow manager to specify the relationship fields of a document resource if one of the resource fields 414, 416, or 418 has not been completed.

FIG. 8 illustrates one embodiment in which the program interface 700 of FIG. 7 is used to edit a document specified in the task document folder 714, as evidenced by status indicator 800. In the example illustrated in FIG. 8, the document entitled "Letter" is being edited. In this embodiment, the extension of the filename (e.g., ".doc", ".xls", ".mdb" ".ppt") specifies the type of document editor (e.g., Work, Excel, Access, PowerPoint) launched when the "Letter" document is highlighted in folder 714 and the edit document button 722 is selected. Edits to the document are made directly to the specific document displayed in the task document window 714. Changes to the document in the window 714 can either be saved or discarded by selecting buttons 802 and 804, respectively. In addition, resources specified either manually or automatically that are specifically related to the document "Letter" being edited are displayed in the resource window 726.

FIG. 9 illustrates one embodiment in which the program interface 700 of FIG. 7 is used to view document histories of the completed task "Obtain References," as indicated by status message 900. In this view, the task document for the "Obtain References" task are displayed in the document window 714. In accordance with another aspect of the invention, the resources associated with the displayed task document in the document window 714 are simultaneously displayed in the resources window 726. This feature of the invention enables someone reviewing a task document to understand the history of the task document while viewing contents of the document. Once a document is highlighted in window 714, its content can be viewed by selecting button 902 or its properties can be viewed by selecting button 904. Similarly, the contents or the properties of resources for the task document can be viewed by selecting buttons 906 and 908, respectively.

Figure 10:
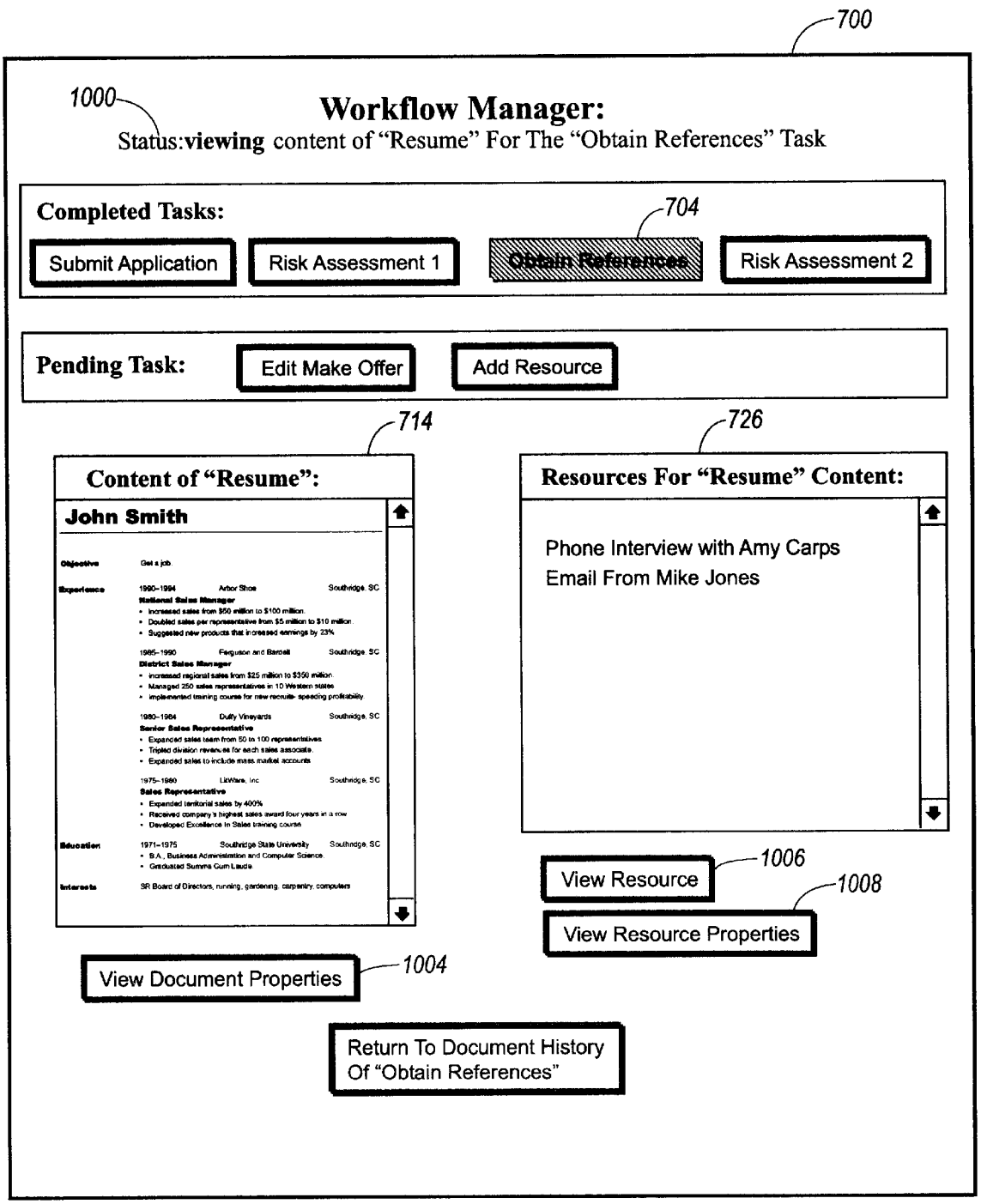
FIG. 10 illustrates how the program interface of FIG. 9 can be used to view the content of the document histories.

FIG. 10 illustrates one manner in which the program interface 700 can provide a user of the process management system to view contents of a document forming the task document while simultaneously examining the resources associated with that document, as indicated by status message 1000. More specifically, the program interface 700 in FIG. 10 was generated when a user selected view document button 902 and the document entitled "Resume" in the task document of the "Obtain References" task 106 presented in the document window 714, which are shown in FIG. 9. In response to this command, the resume of "John Smith" is displayed in document window 714 along with the resources in the resource window 726 that specifically relate to the resume document as illustrated in FIG. 10. This specific relationship between a document forming the task document and the resources is identified by examining the relationship indicators 414, 416, and 418 recorded in the metadata of a task document.

Besides viewing the content of a specific document forming a task document, properties of a specific document can be view by selecting document property view button 1004. Also, a specific resource identified in resource window 726 can be viewed by selecting the resource followed by selecting resource view button 1006. Alternatively, properties of a selected resource can be viewed by selecting the resource and resource property view button 1008. When either document properties or resource properties are viewed, information specific to the particular document or resource is displayed on program interface 700. The information displayed may include but is not limited to the information contained in metadata 404 of task document 402 illustrated in FIG. 4.

D. Preserving Metadata in a Distributed Environment

Figure 11:
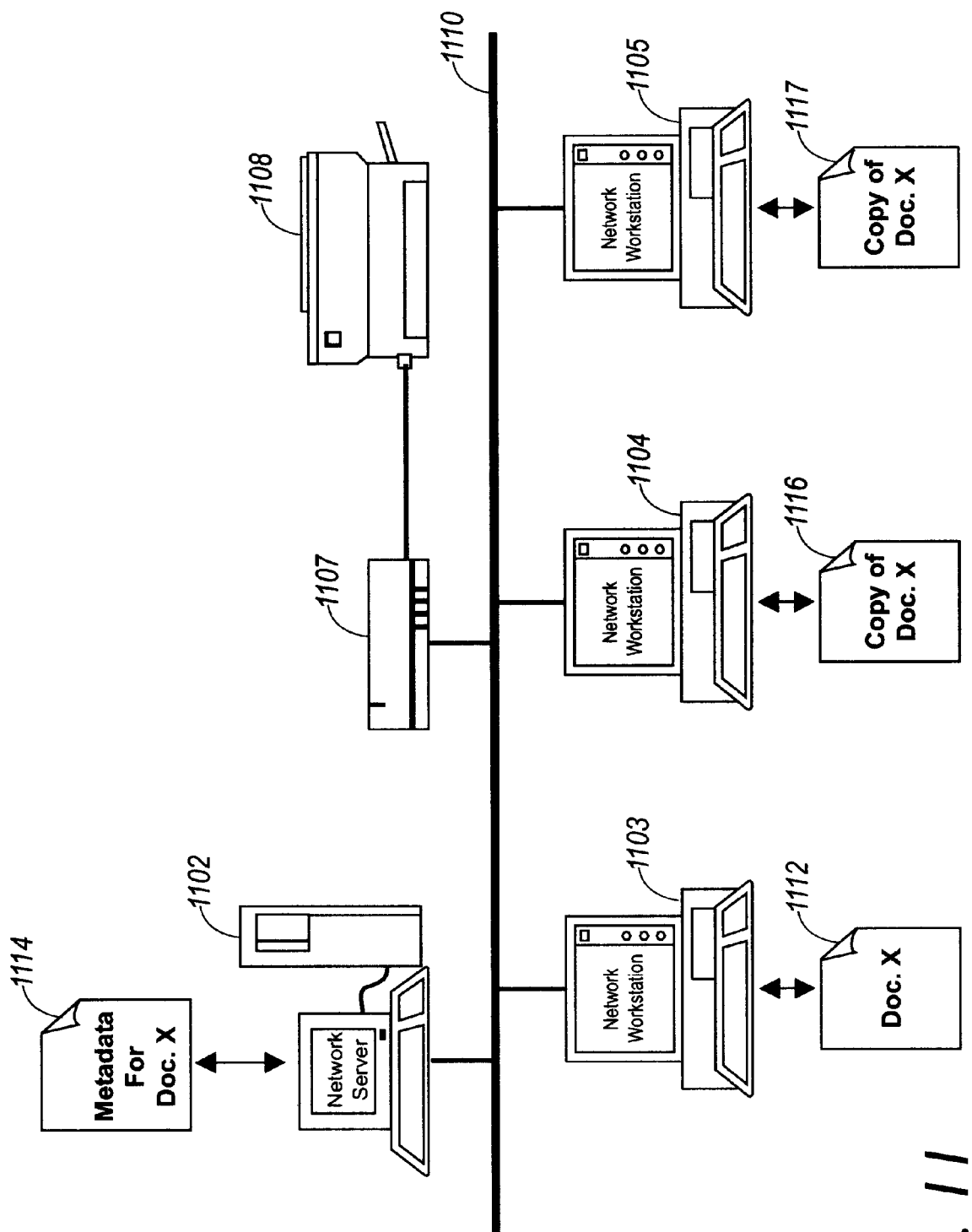
FIG. 11 illustrates an embodiment for preserving metadata of a document in a distributed environment.

In the embodiment illustrated in FIG. 3, metadata 312 and the corresponding document content stored in document store 316 are resident on one or more network servers 304. The embodiment of FIG. 3 therefore provides a centralized repository for both the document content and the document metadata. This embodiment has the advantage of insuring that the metadata and document content remains consistent in the collaborative environment operating the process management system. However, such an organization of metadata and document content may not be desirable in all operating environments. FIG. 11 illustrates an embodiment for preserving metadata in a distributed network environment in which document content is not stored in a centralized repository.

The embodiment in FIG. 11 provides means for preserving document metadata when electronic copies (and copies of the same) are distributed, for example by electronic mail. More specifically, FIG. 11 illustrates a distributed network having a network file server 1102, network workstations 1103, 1104, and 1105, and electronic sub-system 1107 of printer 1108 that communicate together over network 1110. In accordance with the invention, document content 1112, which is created at workstation 1103, includes a reference (e.g., a URL) in the document to metadata 1114 (such as metadata 404 illustrated in FIG. 4). In this embodiment, the metadata 1114 of document 1112 is stored remotely on network file server 1102. When the document 1112 is distributed to operators of workstations 1104 and 1105 by one of a variety of transport protocols, such as mail, the Web, FTP (File Transfer Protocol), RPC (Remote Procedure Call), copies 1116 and 1117 of the document 1112 are made. Advantageously, because the copies 1116 and 1117 reference metadata 1114 stored on file server 1102, the metadata for the document remains consistent even though multiple copies of the same document are produced.

More generally, the organization of metadata and document content illustrated in FIG. 11 involves distribution of a global reference to a document's metadata when copies of the document are distributed electronically over a network, or the like. Advantageously, by defining a document's metadata with a global reference, the document is given a global existence, rather than a local existence for each of the multiple unrelated copies distributed across different machines where metadata is re-instantiated at each recipient's machine. As a consequence of distributing a document with metadata accessed by a global reference, the document's metadata can be processed independent of the document's format. In addition, a document's author can maintain access and control of the document's metadata thereby permitting subsequent changes to the metadata even after copies of the document are distributed.

It will be appreciated by those skilled in the art that the embodiment illustrated in FIG. 11 can consist of a hybrid approach in which some metadata is stored on network server 1102 and other metadata is stored in the document 1112, itself. As set forth above, metadata passed by reference (as opposed to by value; i.e., with the content of the document) provides local control to the author of the document 1112 over the volatility of the content of the metadata. One criterion for identifying whether a specific item of metadata should be passed by reference or passed by value is the specific item's susceptibility to change. For example, a creation-date item of a document may be more effectively passed by value, while a responsible-for item may be more effectively passed by reference.

It will further be appreciated by those skilled in the art that metadata passed by reference can be generated as a URL and encoded as a MIME (Multipurpose Internet Mail Extensions) header when a document is distributed using for example SMTP (Simple Mail Transfer Protocol), HTTP (Hypertext Transfer Protocol), or other protocols that use MIME extensively for message headers. In an alternate embodiment, mobile documents transaction services, as disclosed in U.S. Pat. No. 5,862,321, which is incorporated herein by reference, can be used to distribute metadata of documents passed by reference. In yet another embodiment, peer web servers operating on the author's network workstation 1103 can be used for locally storing while globally mediating metadata of documents passed by reference. In general, these embodiments involve preserving metadata across the distribution of documents electronically over networks, thereby defining a global document.

E. Process Management System with Process Documents

Figure 12:
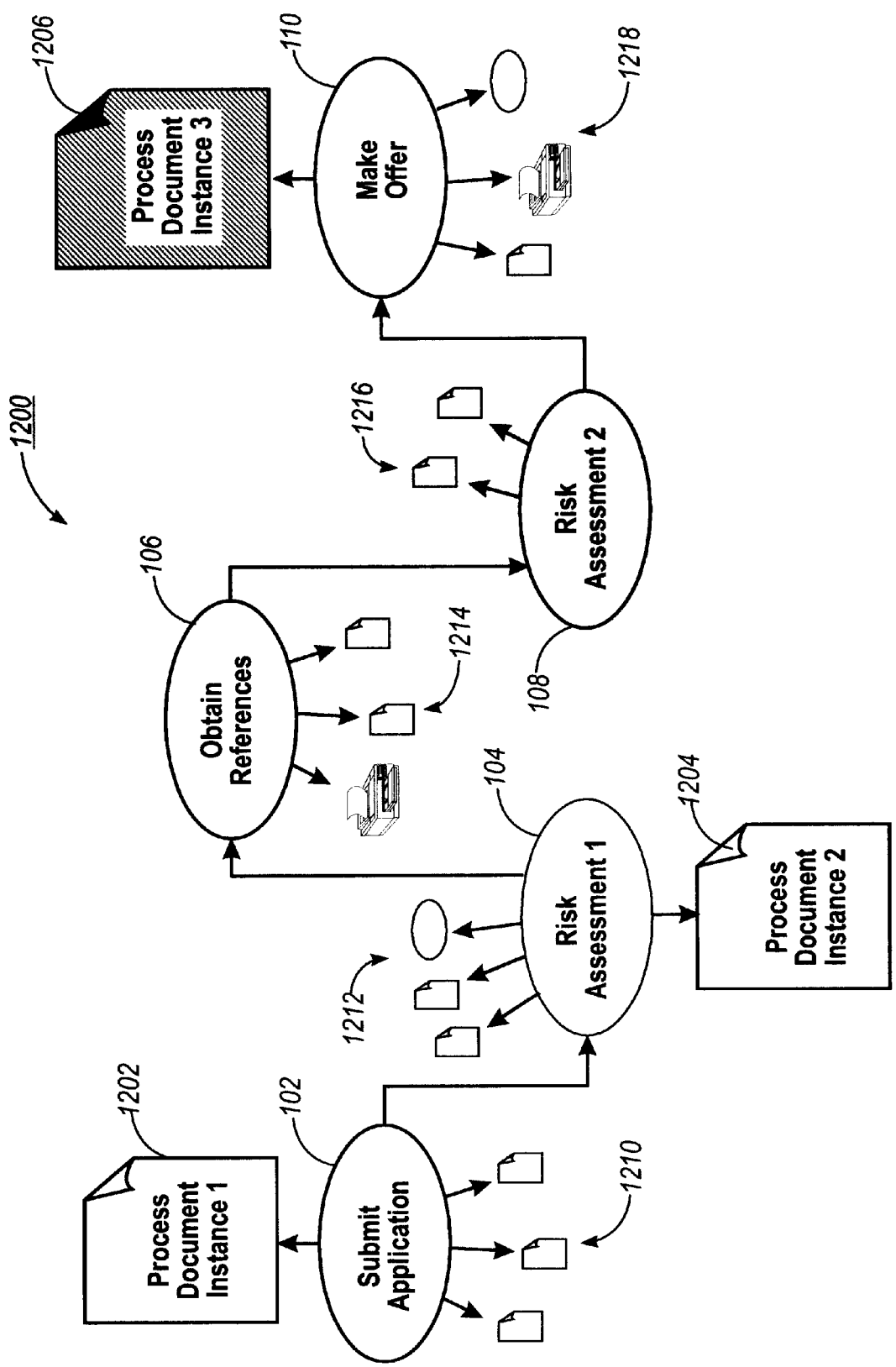
FIG. 12 illustrates an alternate embodiment of the process management system illustrated in FIG. 2.

FIG. 12 illustrates an alternate embodiment of the process management system described above. Unlike the process description 200 illustrated in FIG. 2, which presents a specific instance. of the process description defined in FIG. 2, the process description 1200 illustrated in FIG. 12 provides a system level perspective which identifies all operating instances of the process description illustrated in FIG. 1. That is, FIG. 2 provides a task level perspective to allow creating, viewing and managing resources of a particular instance of a process description, whereas, FIG. 12 provides a system level perspective that permits the management of simultaneously executing instances. Advantageously, this embodiment shows how multiple process instances can be displayed on the same user interface, as user interface 310 illustrated in FIG. 3.

In FIG. 12, there exits three process documents 1202, 1204, and 1206 that identify the three different operating instances of the process description 100 illustrated in FIG. 1. It will be appreciated by those skilled in the art that many more instances of the process description could be executed, which would result in an equivalent number of process documents represented on the process description 1200. Each process document (e.g., 1202, 1204, and 1206) moves through the process description until reaching the "Make Offer" task 110. When one of the process documents that are displayed is selected, the resources associated with each task are displayed on the process description. For example, in FIG. 12 the process document 1206 is selected. The resources of the process document 1206 for each of the tasks 102, 104, 106, 108, and 110 are indicated by reference numbers 1210, 1212, 1214, 1216, and 1218, respectively.

It will be appreciated by those skilled in the art that different methods for representing process documents and resource documents can be implemented using any metadata encoding scheme. In addition to the scheme described above, the "Placeless Documents" document management system is an example of a system supporting an embodiment of the invention. The "Placeless Documents" system allows arbitrary data to be associated with documents as "properties", which are used in the system to record relationships between documents, work tasks and related documents. For example, the task document 201 is representative of a "Placeless Document", which has references to metadata (or includes embedded metadata) of document content. The document content (e.g., document content 206) can be specified using any number of different formats such as a Word document format or an Excel document format. More specifically, the task document 402 shown in FIG. 4 represents a "Placeless Document" when the document content 406 is not embedded but is instead identified using references or links such as a URL (e.g., wherein section 1 of content 406 identifies a Word document using the URL http://ftp.xerox.com/products.doc). More specific details of the Placeless Document system are disclosed in the following U.S. patent application Ser. Nos. 09/143,772; 09/144,032; 09/143,551; 09/144,383; 09/143,802; 09/143,773; 09/143,778; 09/144,143; 09/144,231; 09,143,777; 09/143,555, which are incorporated herein by reference.

F. Summary

To recapitulate, the process management systems of the present invention provides a user executing a task of the process description with the ability to view the process description of a workflow from the perspective of someone who completed a task in the process description. Previously executed tasks are used to provide an index into a historical record of relationships between task documents and their resources in relation to the process description, thereby providing context to others completing unexecuted tasks. The context provided by this mechanism is not general information, which could be provided by the process description itself; instead, it is the specific context for a particular task being executed in the process description.

In addition, the present invention concerns a document management system that provides users of the process management system with a mechanism for tracking metadata of a document, in which the metadata concerns the document's creation, modification and use of documents or objects of interest. It will be appreciated by those skilled in the art that the document management system can be readily integrated with other systems or used as a standalone document editor that records not only document content but the information that relates to its creation and use.

It will be further appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A document management system for recording and viewing activity of document use, comprising:

a user interface for receiving commands from an operator of the document management system;

a first memory for recording content of a document developed at said user interface;

a second memory for recording metadata of the document; the metadata specifying resources referenced while the content of document is developed; and a processor for accessing the metadata of the document to identify relationships between the resources specified in the metadata and the content of the document; the resources identified in the metadata of the document providing context for understanding the document's history of creation, modification, and use;

wherein said processor automatically populates said second memory with metadata that identifies resources referenced while the content of the document recorded in said first memory is developed; and wherein said processor simultaneously displays on said user interface the content of the document developed at the user interface and the resources specified in the metadata.

2. The document management system according to claim 1, wherein the processor specifies a link In the content of the document that identifies a location on a network where the metadata Is accessible and editable independent of the content of the document.

3. The document management system according to claim 2, wherein said processor automatically populates said second memory by identifying links to documents displayed at said user interface while content of the document is recorded in said first memory.

4. The document management system according to claim 3, wherein said first memory, which stores the content of the document, is resident on a first file server and said second memory, which stores the metadata, is resident on a second file server having a unique address on a network; the content of the document on the first file server storing a reference to the unique address of the second file server in the link specified in the content of the document.

5. The document management system according to claim 2, wherein the metadata recorded in said second memory further comprises a first data structure with at least one entry for storing properties of the content of the document, a second data structure with at least one entry for storing a link to the resources of the content of the document, a third data structure with at least one entry for storing properties of the resources identified by the link, and a fourth data structure with at least one entry for storing properties that relate the content of the document to the resources identified by the link.

6. The document management system according to claim 5, wherein said document management system operates in a process management system.

7. The document management system according to claim 6, wherein the operator of the document management system manually enters the metadata at said user interface.

8. The document management system according to claim 1, wherein said processor automatically populates said second memory by identifying links to documents displayed at said user interface while content of the document is recorded in said first memory.

9. The document management system according to claim 8, wherein said user interface further comprises:
   a first window for viewing the content of the document stored in said first memory; and
   a second window for viewing the resources referenced in the metadata of the document stored in said second memory.

10. The document management system according to claim 9, wherein said user interface further comprises means for viewing and editing properties of the metadata of the document; and wherein the properties of the metadata comprise properties of the resources referenced while the content of the document is developed.

11. The document management system according to claim 10, wherein the processor specifies a link in the content of the document that identifies a location where the metadata is accessible and editable independent of the content of the document.

12. The document management system according to claim 11, wherein the properties of the metadata comprise properties of the document content.

13. A method for a document management system to record and view activity of document use, comprising:
   receiving commands at a user interface of the document management system for developing content of a document;
   recording in a first memory of the document management system content of the document developed at the user interface;
   recording in a second memory of the document management system metadata of the document; the metadata of the document specifying resources referenced while the content of document is developed;
   automatically populating the second memory with metadata that identifies resources referenced while the content of the document recorded in the first memory is developed;
   accessing the metadata of the document to identify relationships between the resources specified in the metadata and the content of the document; the resources identified in the metadata of the document providing context for understanding the document's history of creation, modification, and use; and
   simultaneously displaying on the user interface the content of the document developed at the user interface and the resources specified in the metadata.

14. The method according to claim 13, further comprising specifying a link in the content of the document that identifies a location on a network where the metadata is accessible and editable independent of the content of the document.

15. The method according to claim 14, wherein the second memory is automatically populated by identifying links to documents displayed at the user interface while content of the document is recorded in the first memory.

16. The method according to claim 15, wherein the metadata recorded in the second memory further comprises a first data structure with at least one entry for storing properties of the content of the document, a second data structure with at least one entry for storing a link to the resources of the content of the document, a third data structure with at least one entry for storing properties of the resources Identified by the link, and a fourth data structure with at least one entry for storing properties that relate the content of the document to the resources identified by the link.

17. The method according to claim 13, further comprising the step of distributing copies of the document content stored in the first memory to a network workstation; the copies of the document content having a global reference to the metadata of the document stored in the second memory.

18. The method according to claim 17, further comprising the step of accessing the metadata of the document content from the network workstation using the global reference stored in the copy of the document content.

19. The method according to claim 18, wherein said accessing step is performed using a global reference defined by a universal resource locator (URL) to the metadata recorded In said second memory having a first data structure with at least one entry for storing properties of the content of the document, a second data structure with at least one entry for storing a link to the resources of the content of the document, a third data structure with at least one entry for storing properties of the resources identified by the link, and a fourth data structure with at least one entry for storing properties that relate the content of the document to the resources identified by the link.

20. The method according to claim 18, further comprising:
   viewing the content of the document stored in the first memory in a first window; and
   viewing the resources referenced in the metadata of the document stored in the second memory in a second window.

* * * * *